United States Patent
Fukuda et al.

(10) Patent No.: US 11,767,891 B2
(45) Date of Patent: Sep. 26, 2023

(54) CAM CLUTCH UNIT

(71) Applicant: TSUBAKIMOTO CHAIN CO., Osaka (JP)

(72) Inventors: Akihiro Fukuda, Osaka (JP); Hirokazu Tsuneda, Osaka (JP); Yuji Kurematsu, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 0 days.

(21) Appl. No.: 18/093,834

(22) Filed: Jan. 6, 2023

(65) Prior Publication Data
US 2023/0228302 A1 Jul. 20, 2023

(30) Foreign Application Priority Data
Jan. 18, 2022 (JP) .................... 2022-005605

(51) Int. Cl.
*F16D 41/067* (2006.01)

(52) U.S. Cl.
CPC .................... *F16D 41/067* (2013.01)

(58) Field of Classification Search
CPC . F16D 41/067; F16D 41/07; F16D 2041/0603
See application file for complete search history.

(56) References Cited

U.S. PATENT DOCUMENTS

| | | | | |
|---|---|---|---|---|
| 5,664,653 A | * | 9/1997 | Kurita | F16D 41/07 188/82.1 |
| 6,640,949 B1 | * | 11/2003 | Vranish | F16D 41/07 192/41 A |
| 9,739,320 B2 | * | 8/2017 | Ishitani | F16D 41/07 |
| 10,422,392 B2 | * | 9/2019 | Shibata | F16D 41/07 |
| 2005/0067248 A1 | | 3/2005 | Takasu | |

FOREIGN PATENT DOCUMENTS

JP 2005-106135 A 4/2005

* cited by examiner

*Primary Examiner* — Huan Le
(74) *Attorney, Agent, or Firm* — WHDA, LLP (57) ABSTRACT

To provide a cam clutch unit that reduces the number of machining steps and level of difficulty of cam clutch production and reduces rotation resistance caused by rollers. The cam clutch unit includes: a plurality of cams and a plurality of rollers circumferentially arranged between an inner race and an outer race that are coaxial and rotatable relative to each other; a cage ring having a plurality of pocket portions that restrict circumferential relative movements of the cams and the rollers; and an annular spring that biases the cams. The cams each have, on one axial end face, an engagement step that can engage with the spring. The cage ring has a plurality of hook portions that restrict axial movements of the annular spring.

7 Claims, 7 Drawing Sheets

CAM CLUTCH UNIT

BACKGROUND OF THE INVENTION

1. Field of the Invention

The present invention relates to a cam clutch unit that transmits and interrupts torque between an input shaft and an output shaft.

2. Description of the Related Art

In some known cam clutch units, there are provided: a plurality of cams and a plurality of rollers arranged between an inner race and an outer race that are coaxial and rotatable relative to each other; a cage ring having a plurality of pocket portions that restrict circumferential relative movements of the cams and the rollers; and an annular spring that biases the cams.

In the cam clutch unit 500 with cams and rollers shown in FIG. 11 to FIG. 15, for example, a plurality of cams 530 and a plurality of rollers 540 are accommodated in the pocket portions 551 of a cage ring 550 such that the cams 530 and rollers 540 are circumferentially arranged between the inner race and outer race that are coaxial and rotatable relative to each other, so that the cams 530 and rollers 540 are restricted from moving in the circumferential direction relative to each other.

The cams 530 and rollers 540 are configured to have circumferential grooves 535 and 545, respectively, with an annular spring 560 being accommodated in the grooves 535 and 545 so that the cams 530 and rollers 540 are biased toward the inner race.

SUMMARY OF THE INVENTION

In the known cam clutch unit, the cams 530 and rollers 540, of which materials are required to be highly resistant to wear and impact, have circumferential grooves 535 and 545 in middle part thereof for accommodating the annular spring 560. This leads to problems that the production of the cams 530 and rollers 540 needs an increased number of machining steps and an advanced level of machining, hence, posing a limitation on the machining, i.e., the cams and rollers could not be made thinner beyond a certain limit.

The rollers 540 need to be bound only in the axial direction and have to be able to rotate freely. However, the friction generated between the bottom of the grooves 545 and the spring 560 sliding thereon not only causes the problem of substantial rotation resistance during high-speed rotation but also could affect the service life of the entire cam clutch due to wear-induced deterioration of the spring 560.

A cam clutch unit in which the cams and rollers are provided with portions for receiving pressure from a spring on both axial ends is also known, as shown, for example, in Japanese Patent Application Publication No. 2005-106135. However, these cams require a lock mechanism for preventing axial detachment of the spring. Therefore, while the machining of these cams and rollers is less difficult, the process still needs just as many machining steps.

An object of the present invention is to solve the above problems and to provide a cam clutch unit that can reduce the number of machining steps and level of difficulty of cam clutch production, can be reduced in thickness, and can reduce rotation resistance caused by rollers.

The present invention solves the above problems by providing a cam clutch unit including: a plurality of cams and a plurality of rollers arranged between an inner race and an outer race that are coaxial and rotatable relative to each other; a cage ring having a plurality of pocket portions that restrict circumferential relative movements of the cams and the rollers; and an annular spring that biases the cams, the cam having, on one axial end face, an engagement step that can engage with the spring, the cage ring having a plurality of hook portions that restrict axial movements of the annular spring.

According to the cam clutch unit set forth in claim 1, the cams have an engagement step that can engage with the spring on one axial end face, which simplifies the structure and reduces the number of machining steps and level of difficulty of production, and enables a reduction in the thickness.

The cage ring has a plurality of hook portions that restrict axial movements of the annular spring. The cams and rollers need not be machined to have an engagement step on one end face in a shape that restricts axial movements of the spring, and therefore the number of machining steps and the level of difficulty are reduced.

According to the configuration set forth in claim 2, the hook portion has a hook bottom portion that restricts radial movements of the annular spring. The hook bottom portion regulates the radius of the spring at both ends of each cam so that the pressure each cam receives is less affected by posture changes of other cams. A more precise cam clutch can be provided, since the row of cams can be pressed uniformly.

According to the configuration set forth in claim 3, the pocket portions of the cage ring have surfaces circumferentially adjoining the rollers and shaped so as to restrict movements of the rollers toward the outer race and the inner race. This prevents radially outward detachment of the rollers during the production process of the cam clutch.

According to the configuration set forth in claim 4, the cam has, on an end face opposite from the engagement step, a restriction step, and the pocket portion of the cage ring has, on a surface axially adjacent the restriction step of the cam, a restriction protrusion that restricts tilt of the cam. The cam posture can thus be controlled so that the pressure from the spring is converted to appropriate rotation of the cams without compromising responsiveness. Therefore, a more precise and responsive cam clutch can be provided.

Moreover, smooth insertion of cams is ensured during the production process of the cam clutch because the configuration prevents radially outward detachment of the cams and minimizes tilting of the cams.

According to the configuration set forth in claim 5, the rollers each have a hollow shape, so that the cam clutch unit can be made more lightweight.

According to the configuration set forth in claim 6, the rollers each have a roller shaft axially longer than the rollers and loosely fitted in a hollow part of the roller. The roller shafts cause only little sliding resistance with the rollers and prevent radially outward detachment of the rollers. The spring does not make any frictional sliding contact with the rollers, and therefore the rotation resistance is reduced. Thus the adverse effects on the service life of the entire cam clutch can be reduced.

According to the configuration set forth in claim 7, the rollers each have an axial length not greater than an axial length of the cams not including the engagement step. The rollers are bound only in the axial direction and can rotate freely, so that there is hardly any frictional sliding contact between the rollers and the spring and thus the rotation resistance can be reduced.

DESCRIPTION OF THE PREFERRED EMBODIMENTS

As shown in FIG. 1 to FIG. 5, the cam clutch unit 100 according to one embodiment of the present invention includes: a plurality of cams 130 provided as sprags for transmitting and interrupting torque between an inner race and an outer race, in an annular space between raceways of the inner race and outer race that are coaxial and rotatable relative to each other; a plurality of rollers 140 allowing the inner race and outer race to freely rotate; a cage ring 150 having a plurality of pocket portions 151 and 152 that restrict circumferential movements of the cams 130 and rollers 140 relative to each other, and an annular spring 160 biasing each of the plurality of cams 130 toward a direction in which the cams wedge against the inner race and outer race.

Figure 1:
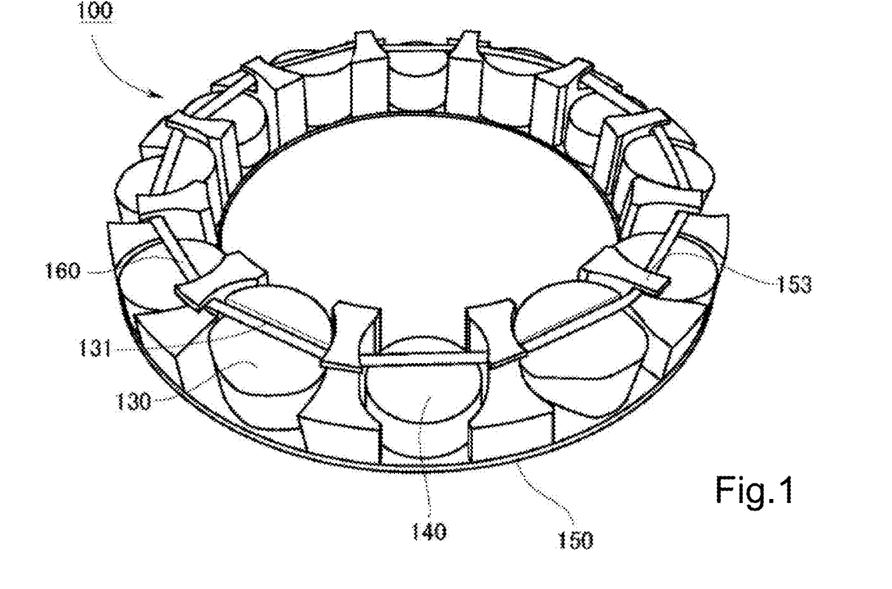
FIG. 1 is a perspective view of a cam clutch unit according to one embodiment of the present invention.
Figure 2:
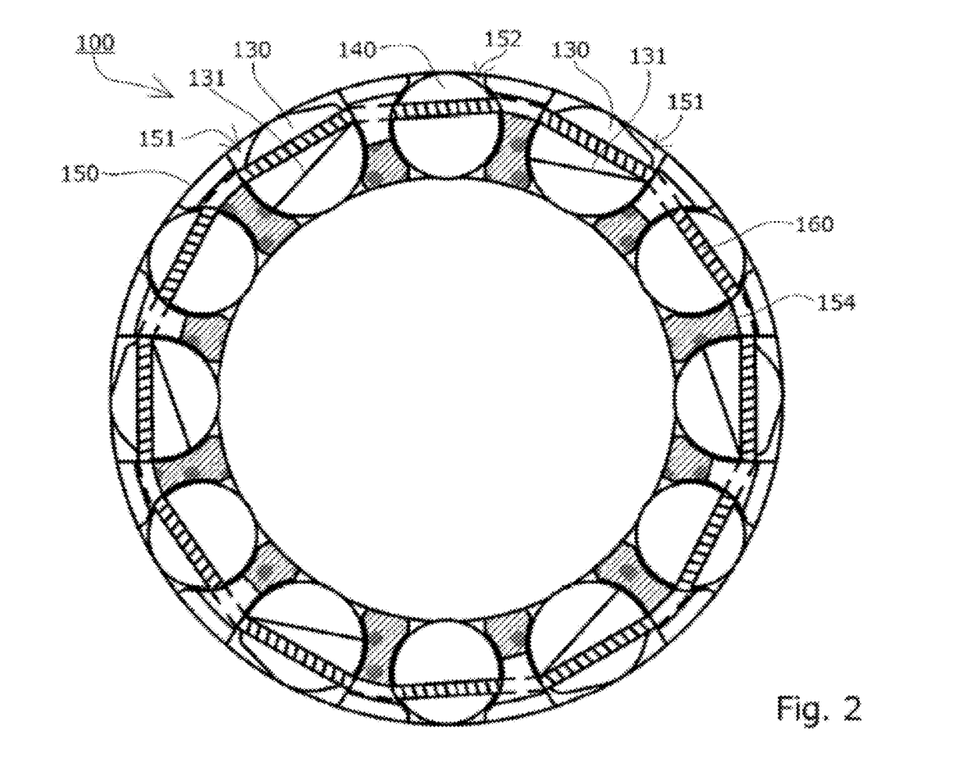
FIG. 2 is a side view of the cam clutch unit shown in FIG. 1 viewed from the direction of the rotation axis.
Figure 3:
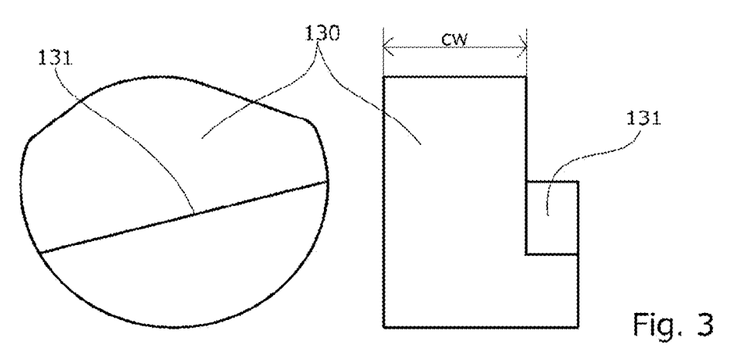
FIG. 3 is a side view and a front view of the cam in the cam clutch unit shown in FIG. 1.

Each of the plurality of cams 130 has an engagement step 131 that can engage with the annular spring 160 on one axial end face as shown in FIG. 3 and others.

In this embodiment, the engagement step 131 is inclined, the right side in the drawings being on the radially outer side when the cam 130 is in a free state. The spring 160 pressing the right side of the engagement step 131 biases the cam 130 toward the inner race, as well as causes the cam 130 to rotate in an operating direction.

Figure 4:
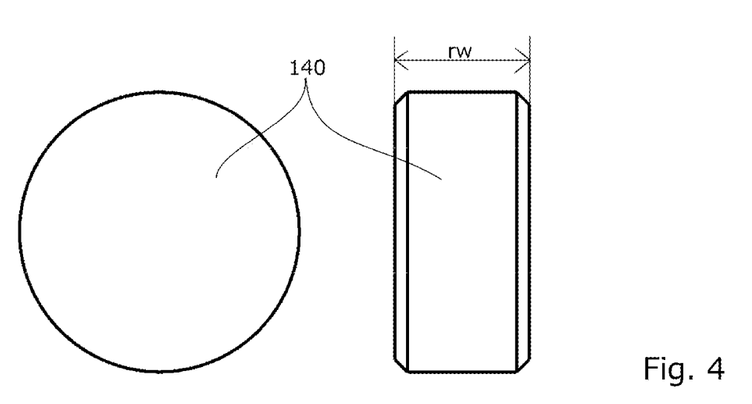
FIG. 4 is a side view and a front view of the roller in the cam clutch unit shown in FIG. 1.

The plurality of rollers 140 do not have any groove or step as shown in FIG. 4 and others. In this embodiment, the roller 140 has an axial length rw that is not greater than the axial length cw of the cam 130 not including the engagement step 131.

In this embodiment, both end faces of the rollers 140 are chamfered along the outer peripheral edges to avoid catching the spring 160.

The cage ring 150 includes a plurality of pocket portions 151 and 152 that respectively accommodate and restrict circumferential relative movements of the cams 130 and the rollers 140, and a plurality of hook portions 153 that restrict axial movements of the annular spring 160.

In this embodiment, the pocket portions 151 and 152 of the cage ring 150 that respectively accommodate the cams 130 and the rollers 140 are circumferentially alternately disposed.

The pocket portions 151 and 152 each restrict the movements of the cams 130 and rollers 140 toward one axial direction by an end face at one axial end, and the spring 160 restricts the movements of the cams and rollers toward the other axial direction.

In this embodiment, the pocket portions 152 that accommodate the rollers 140 have surfaces adjoining the rollers 140 and shaped such as to restrict the movements of the rollers 140 toward the outer race and the inner race.

The rollers 140 may have an axial length rw that is greater than the axial length cw of the cam 130 not including the engagement step 131. In this case, the pocket portions 151 and 152 of the cage ring 150 may be configured to allow the rollers 140 to protrude more than the cams 130 on the opposite side from the engagement steps 131 of the cams 130. This way, the cam clutch unit can tolerate a larger axial load, with the rollers 140 being free from the radial pressure exerted by the spring 160.

Figure 5:
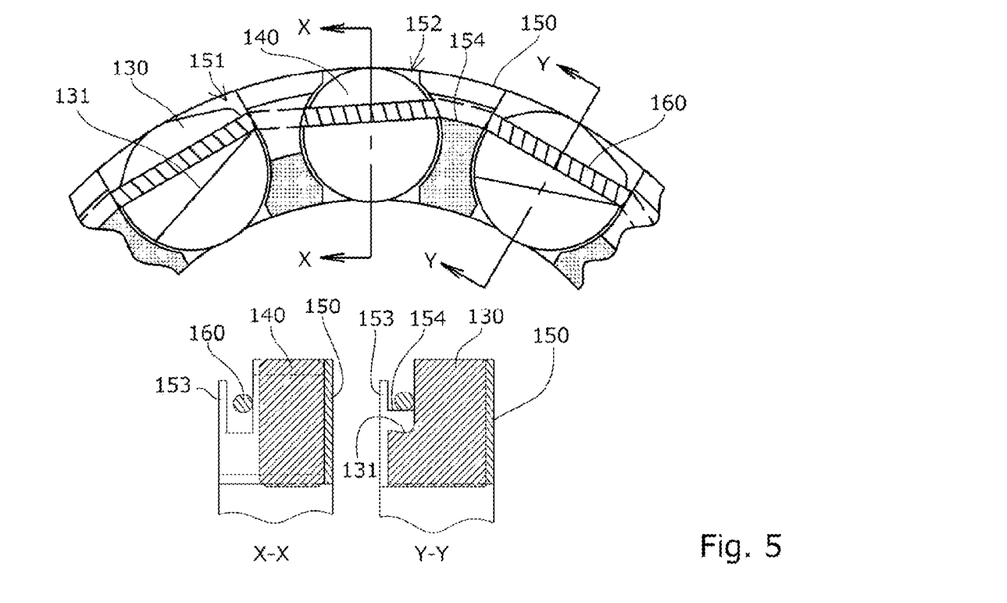
FIG. 5 is a partial side view and a cross-sectional view of the cam clutch unit shown in FIG. 1.

Furthermore, in this embodiment, as shown in FIG. 5, the hook portions 153 adjacent on the left side of the pocket portions 151 accommodating the cams 130 each have a hook bottom portion 154 that restricts radial movement of the annular spring 160.

This allows the spring 160 to press the right side of the engagement steps 131 of the cams 130 without the rollers 140 restraining the tension of the spring 160 at all. Each cam 130 is individually pressed by a midpoint of the span of the spring 160 tensioned between two hook bottom portions 154, so that they are capable of highly precise and uniform movements without being affected by posture changes of other cams 130.

While this embodiment employs the same numbers of alternately arranged cams 130 and rollers 140, any numbers of cams 130 and rollers 140 may be used in any arrangement.

The cams 130 may have any shape, such as a sprag shape, for example.

Likewise, the hook bottom portions 154 may be arranged in any way in accordance with the respective numbers and arrangements of the cams 130 and rollers 140. The hook bottom portions 154 may have the same height in the radial direction, or may have different heights depending on their positions in the circumferential direction.

Suitable arrangement and setting of the heights of the hook bottom portions 154 in accordance with the respective numbers and arrangements of the cams 130 and rollers 140 allows each cam to move uniformly and precisely as described in the embodiment above.

Figure 6:
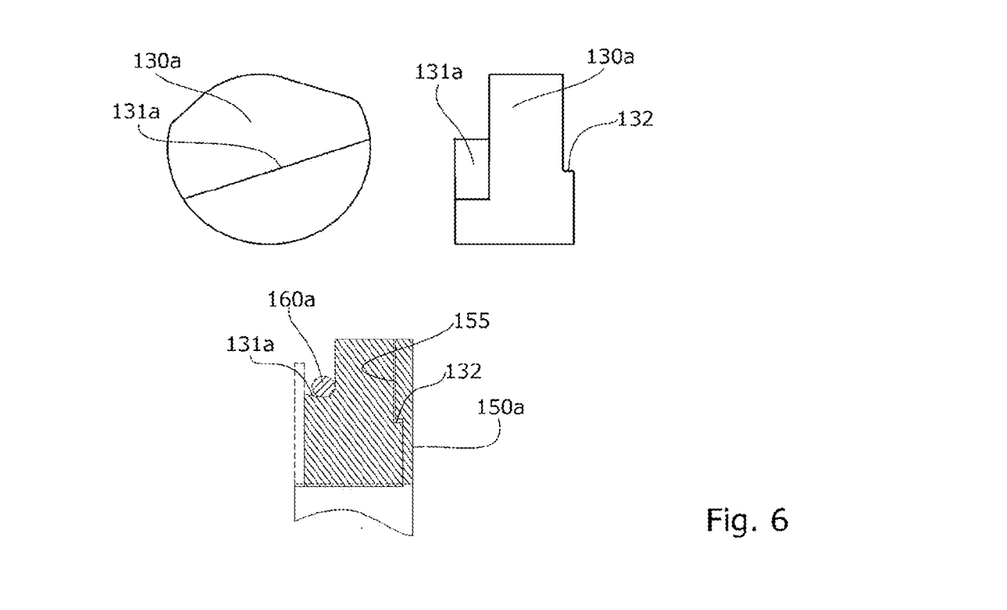
FIG. 6 is a side view and a front view of the cam in a cam clutch unit according to another embodiment of the present invention.

In a cam clutch unit according to another embodiment of the present invention, the cams 130a include a restriction step 132 on the end face opposite from the engagement step 131*a* as shown in FIG. 6. The cage ring 150*a* has restriction protrusions 155 that restrict the tilt of the cams 130*a* on the surface of the pocket portions axially adjacent the restriction steps 132 of the cams 130*a*.

The restriction protrusions 155 prevent the cams 130*a* from shifting and tilting on the opposite side from the engagement step 131*a*, as well as restrict the rotation range of the cams 130*a*, which prevents detachment of the cams and enhances the operation precision and speed of the cam clutch.

Figure 7:
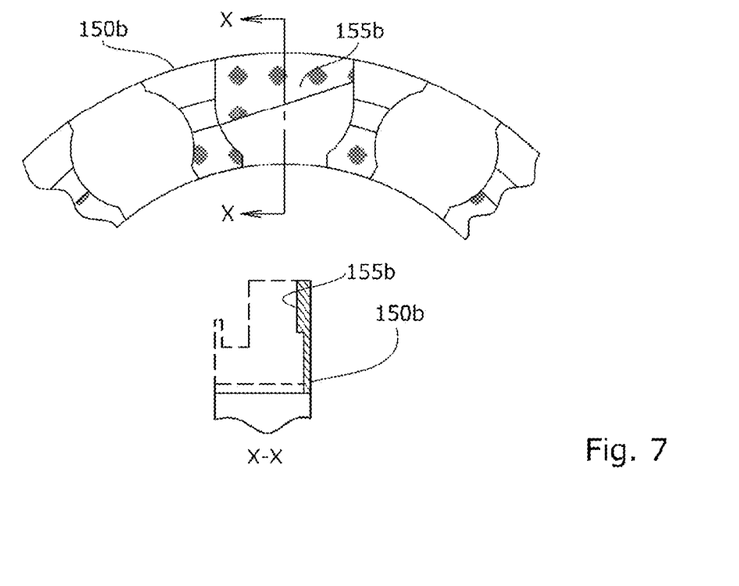
FIG. 7 is a partial side view and a cross-sectional view of the cage ring in the cam clutch unit according to another embodiment of the present invention.
Figure 8:
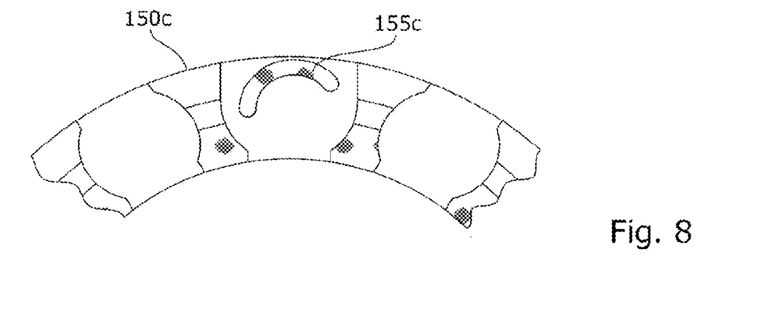
FIG. 8 is a partial side view of a variation example of the cage ring shown in FIG. 7.
Figure 9:
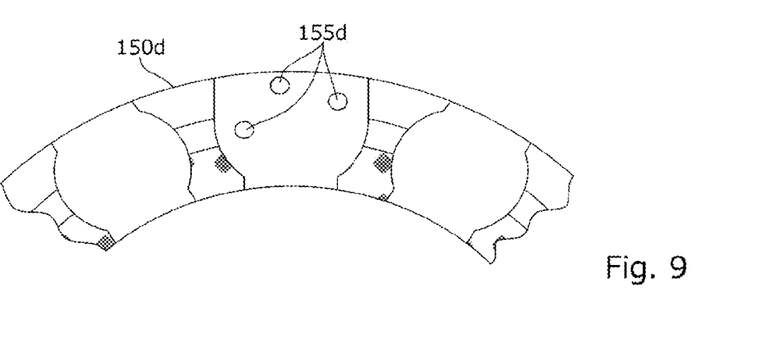
FIG. 9 is a partial side view of another variation example of the cage ring shown in FIG. 7.

The restriction protrusions may have any shape as long as they can prevent tilting of the cams and restrict cam rotation range. For example, as shown in FIG. 7, the entire outer peripheral side of the cage ring 150*d* may be axially protruded to form the restriction protrusions 155*b*. A crescent-shape restriction protrusion 155*c* shown in FIG. 8 would be able to define circumferential front and back limits and radial outer peripheral limit of the cage ring 150*c*. Restriction protrusions 155*d* may be disposed at three points in the circumferential front and back and near the radial outer peripheral edge as shown in FIG. 9.

Figure 10:
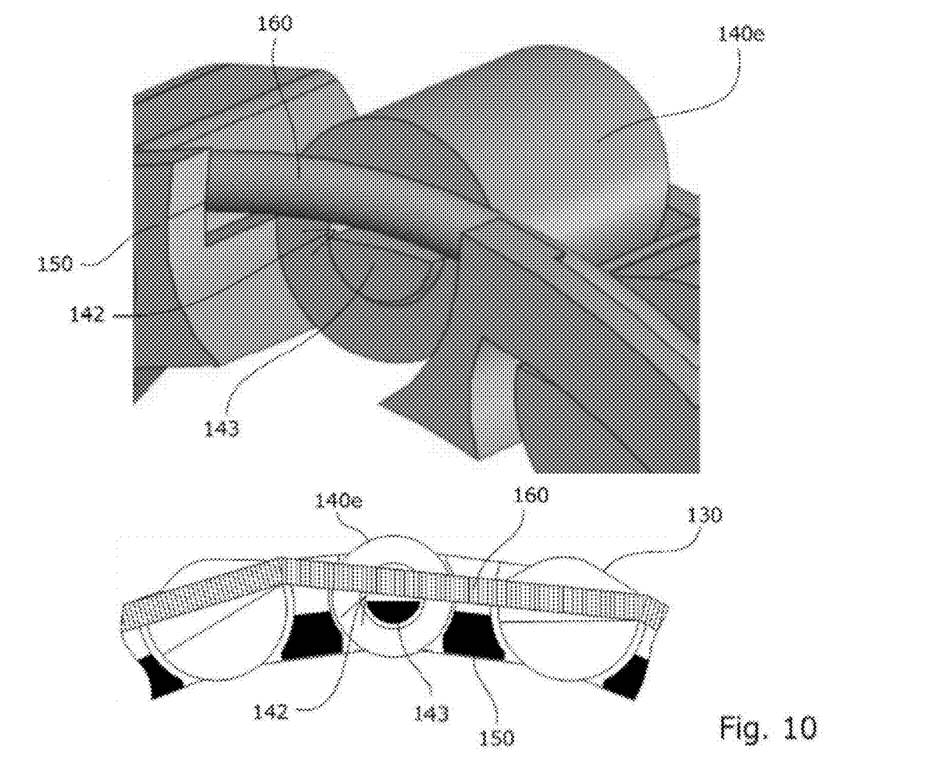
FIG. 10 is a schematic partially enlarged perspective view and a side view of a cam clutch unit according to yet another embodiment of the present invention.
Figure 11:
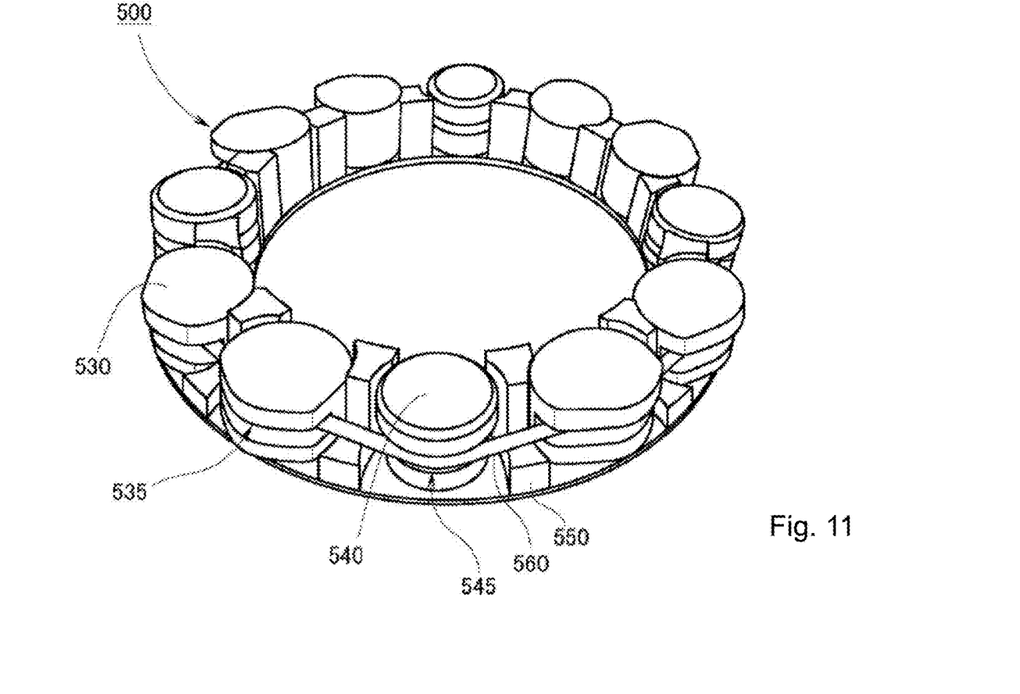
FIG. 11 is a perspective view of a conventional cam clutch unit.
Figure 12:
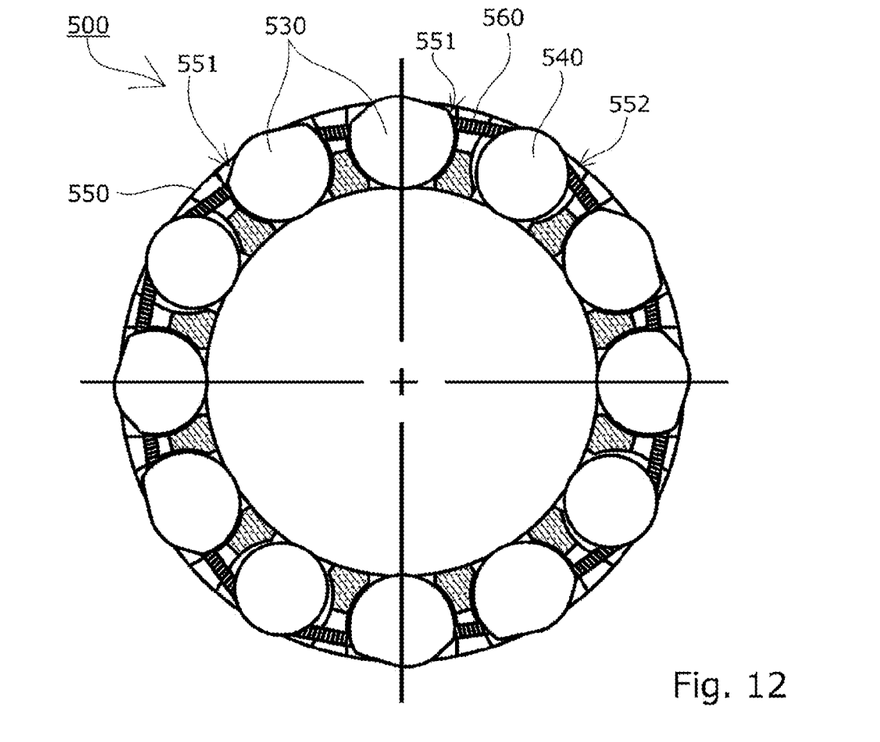
FIG. 12 is a side view of the cam clutch unit shown in FIG. 11 viewed from the direction of the rotation axis.
Figure 13:
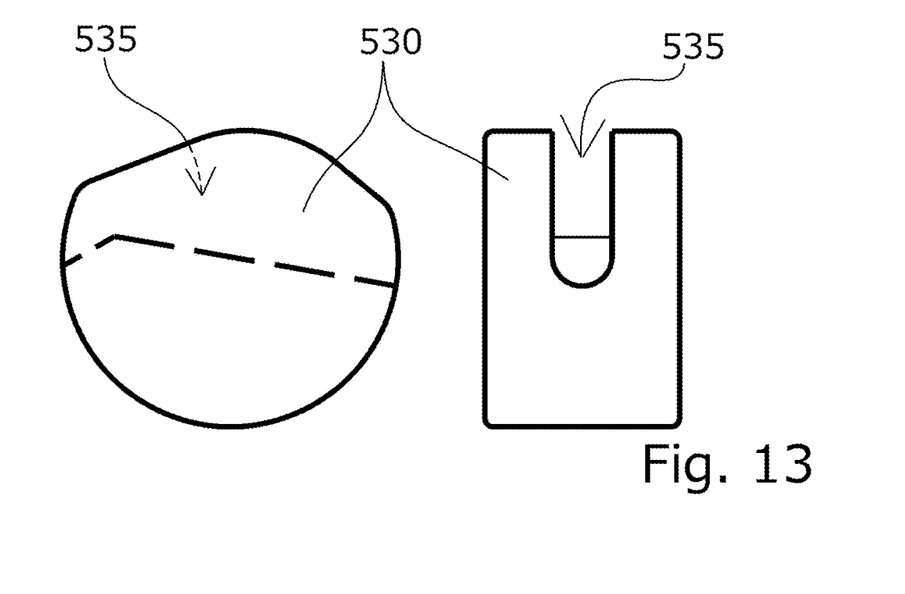
FIG. 13 is a side view and a front view of the cam in the cam clutch unit shown in FIG. 11.
Figure 14:
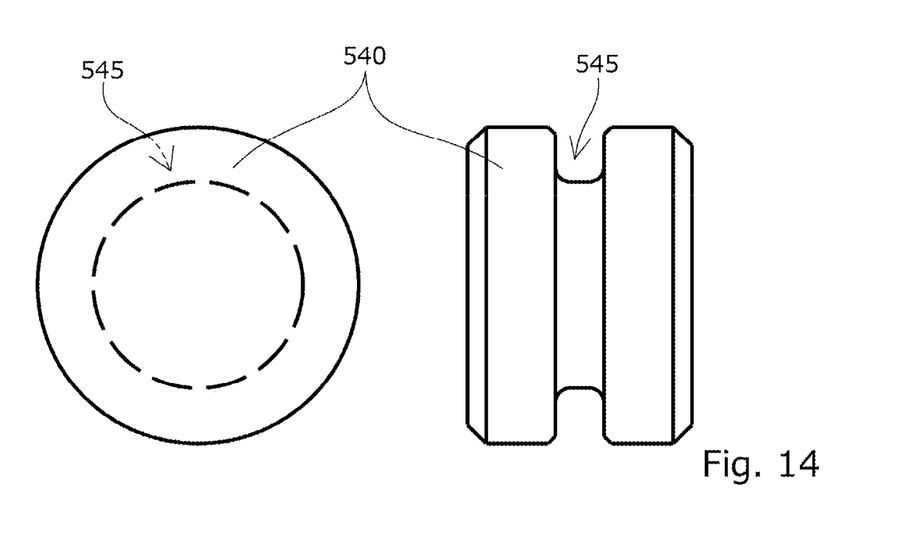
FIG. 14 is a side view and a front view of the roller in the cam clutch unit shown in FIG. 11.
Figure 15:
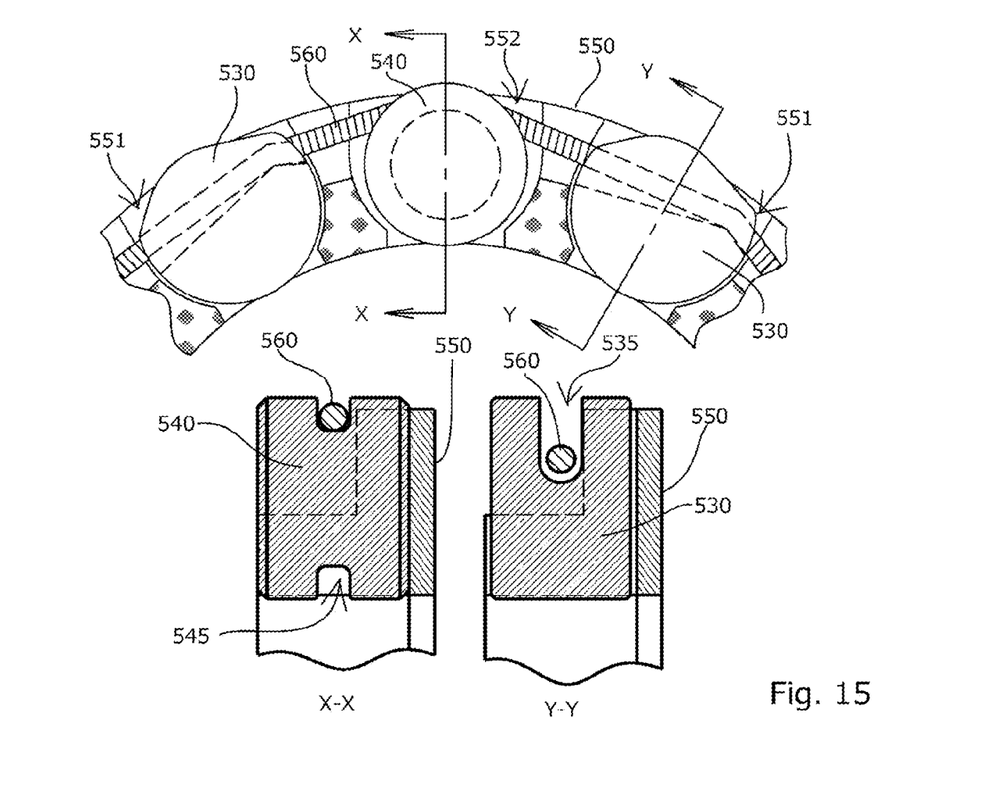
FIG. 15 is a partial side view and a cross-sectional view of the cam clutch unit shown in FIG. 11.

In a cam clutch unit according to yet another embodiment of the present invention, the rollers 140*e* are hollow and have a roller shaft 143 axially longer than the roller 140*e* loosely fitted in the hollow part 142 of the roller 140*e*, as shown in FIG. 10.

The rollers 140*e* can thus be made more lightweight. The spring 160 restricting radial movements of the roller shafts 143 that do not rotate prevents radial detachment of the rollers 140*e* irrespective of the shape of the pockets.

The spring 160 itself will suffer less wear, which can reduce adverse effects on the service life of the entire cam clutch.

While one embodiment of the present invention has been described above in detail, the present invention is not limited to the above-described embodiment and may be carried out with various design changes without departing from the scope of the present invention set forth in the claims.

For example, instead of providing the engagement step that can engage with the spring only on one end face at one axial end of the cams as in the embodiment described above, the engagement step may be provided on both axial end faces of the cams, with hook portions being provided also at both axial ends of the cage ring, for the cams to be biased by two annular springs.

What is claimed is:

1. A cam clutch unit comprising:
   a plurality of cams and a plurality of rollers arranged between an inner race and an outer race that are coaxial and rotatable relative to each other;
   a cage ring having a plurality of pocket portions that restrict circumferential relative movements of the cams and the rollers; and
   an annular spring that biases the cams,
   the cam having, on one axial end face, an engagement step that can engage with the spring,
   the cage ring having a plurality of hook portions that restrict axial movements of the annular spring.

2. The cam clutch unit according to claim 1, wherein the hook portion has a hook bottom portion that restricts radial movements of the annular spring.

3. The cam clutch unit according to claim 1, wherein the pocket portions of the cage ring have surfaces circumferentially adjoining the rollers and shaped so as to restrict movements of the rollers toward the outer race and the inner race.

4. The cam clutch unit according to claim 1, wherein
   the cam has, on an end face opposite from the engagement step, a restriction step, and
   the pocket portion of the cage ring has, on a surface axially adjacent the restriction step of the cam, a restriction protrusion that restricts tilt of the cam.

5. The cam clutch unit according to claim 1, wherein the rollers each have a hollow shape.

6. The cam clutch unit according to claim 5, wherein the rollers each have a roller shaft axially longer than the rollers and loosely fitted in a hollow part of the roller.

7. The cam clutch unit according to claim 1, wherein the rollers each have an axial length not greater than an axial length of the cam not including the engagement step.

* * * * *